(12) United States Patent
Ezure et al.

(10) Patent No.: US 9,321,195 B2
(45) Date of Patent: Apr. 26, 2016

(54) METHOD AND DEVICE FOR PRODUCING A PIPE MEMBER

(75) Inventors: Kazuhiro Ezure, Koga (JP); Masao Motonaga, Koga (JP); Naoya Mieda, Koga (JP)

(73) Assignee: Sanoh Industrial Co., Ltd., Tokyo (JP)

( * ) Notice: Subject to any disclaimer, the term of this patent is extended or adjusted under 35 U.S.C. 154(b) by 388 days.

(21) Appl. No.: 13/884,330

(22) PCT Filed: Jul. 17, 2012

(86) PCT No.: PCT/JP2012/068548
§ 371 (c)(1),
(2), (4) Date: Jun. 17, 2013

(87) PCT Pub. No.: WO2013/015232
PCT Pub. Date: Jan. 31, 2013

(65) Prior Publication Data
US 2014/0183774 A1  Jul. 3, 2014

(30) Foreign Application Priority Data

Jul. 26, 2011  (JP) ................................. 2011-162772

(51) Int. Cl.
| B29C 45/26 | (2006.01) |
| B29C 43/02 | (2006.01) |
| B29C 45/17 | (2006.01) |
| B29C 44/42 | (2006.01) |
| B29L 23/00 | (2006.01) |
| B29K 105/12 | (2006.01) |

(52) U.S. Cl.
CPC ................ *B29C 43/02* (2013.01); *B29C 44/42* (2013.01); *B29C 45/1711* (2013.01); *B29C 2045/1719* (2013.01); *B29C 2045/1728* (2013.01); *B29K 2105/12* (2013.01); *B29L 2023/004* (2013.01)

(58) Field of Classification Search
CPC  B29C 44/42; B29C 2045/0087; B29C 43/02; B29C 45/1711; B29C 2045/1728; B29C 2045/1719; B29L 2023/004; B29K 2105/12
USPC ................................................ 264/45.5, 138
See application file for complete search history.

(56) References Cited

U.S. PATENT DOCUMENTS

| 7,077,987 B2 * | 7/2006 | Yamaki ................. B29C 44/585 264/45.5 |
| 2009/0029143 A1 * | 1/2009 | Kanae ................... B29C 44/586 428/315.5 |
| 2012/0068388 A1 * | 3/2012 | Sakamoto ........... B29C 45/1704 264/573 |

FOREIGN PATENT DOCUMENTS

| JP | 2000094468 A | 4/2000 |
| JP | 2000094469 A | 4/2000 |
| WO | WO 2010116580 A1 * | 10/2010 ......... B29C 45/1704 |
| WO | WO02053347 A1 | 7/2011 |

* cited by examiner

*Primary Examiner* — Galen Hauth
(74) *Attorney, Agent, or Firm* — R. Neil Sudol; Henry D. Coleman

(57) ABSTRACT

An object of the present invention is to provide a method for producing a pipe, which is capable of reducing the amount of thermoplastic material, without complicating an device for producing a pipe. The present invention provides a method for producing a pipe, comprising a thermoplastic material filling process for filling a die with a thermoplastic material, and a thermoplastic material discharging process for pushing out an unsolidified part of the thermoplastic material in the molding die using pressurized fluid, wherein the thermoplastic material is mixed with a foaming agent, the method further comprises a process for foaming the thermoplastic material filling the molding die, and the thermoplastic material discharging process is a process for pushing out a inner part of the thermoplastic material foamed in the molding die, by using the pressurized fluid prior to solidification of the inner part.

12 Claims, 5 Drawing Sheets

(a)

(b)

(c)

(a)

(b)

(a)

(b)

(c)

(a)

(b)

METHOD AND DEVICE FOR PRODUCING A PIPE MEMBER

TECHNICAL FIELD

The present invention relates to a method and device for producing a pipe member, which perform so-called fluid-assisted injection molding having a thermoplastic material filling process for filling a molding die with a thermoplastic material and a thermoplastic material discharging process for extruding an unsolidified part of the thermoplastic material in the molding die by using pressurized fluid.

BACKGROUND ART

Fluid-assisted injection molding is known as a method for producing a pipe member.

FIGS. 4 and 5 each schematically show a method for producing a pipe member according to a conventional technology in which the fluid-assisted injection molding is used.

FIG. 4 is a diagram showing a state of a thermoplastic material in a molding die cavity in a thermoplastic material filling process according to the conventional technology, wherein FIG. 4(a) is a longitudinal cross-sectional diagram taken along an axial direction of the thermoplastic material in the die cavity, and FIG. 4(b) a traverse cross-sectional diagram taken along a direction perpendicular to the axis of the thermoplastic material in the molding die cavity. These diagrams show that the molding die cavity is filled with non-foamed molten thermoplastic material. FIG. 4(c) is a graph that schematically shows a viscosity distribution η(r) of the thermoplastic material in the molding die cavity as a function of a radial position r of the molding die cavity. This graph shows that the viscosity η of the thermoplastic material at its outer layer is high because the outer layer is in contact with an inner surface of the molding die and therefore loses its heat, as a result in a temperature decrease, and that the viscosity η at a central part of the thermoplastic material is relatively low because the temperature thereof remains high.

FIG. 5 is a diagram showing the state of the thermoplastic material in the die cavity in a thermoplastic material discharging process according to the conventional technology, wherein FIG. 5(a) is a longitudinal cross-sectional diagram taken along the axial direction of the thermoplastic material in the die cavity, showing a state in which the thermoplastic material, having pressurized fluid introduced thereto and thus having low viscosity (high fluidity) at its central part, is pushed out. FIG. 5(b) is a traverse cross-sectional diagram taken along line p-p of FIG. 5(a), showing that a hollow part is formed in the central part. Eventually the pressurized fluid is introduced over the entire length of the molding die cavity and the hollow part is formed in the central part in all cross sections, thereby producing a pipe member.

The conventional method for producing a pipe member illustrated in FIGS. 4 and 5 uses a difference in viscosity that is caused by a temperature gradient based on the distance between the inner surface of the die and the non-foamed molten thermoplastic material filling the molding die cavity (the difference in viscosity between a highly viscous skin layer in the vicinity of a molding die cavity surface and a low-viscous core layer in the central part of the thermoplastic material), to push out only the thermoplastic material located in the central part of the molding die cavity, in order to produce a pipe member.

This method for producing a pipe member depends on the size of the molded pipe member or the timing at which the pressurized fluid is introduced. In the most cases, the thickness is 15 to 20% of the outer diameter of pipe. It is difficult to reduce the thickness of the pipe member. For this reason, the requirement specifications and the requests for weight reduction and material cost reduction cannot be met.

For example, when replacing a metallic pipe of an automobile with a resin pipe obtained through fluid-assisted injection molding, there is a limit in increasing the outer diameter of the pipe from the viewpoint of the layout of the pipe. In case of the resin pipe in which the thickness of a pipe wall reaches 15 to 20% of the outer diameter of a mold, the inner diameter of the resin pipe becomes small when the outer diameter thereof is set to be same as that of the metallic pipe, increasing the pressure loss. Therefore, a problem in a cooling pipe, for example, is that an expensive large pump with high energy consumption is required.

The conventional method for producing a pipe member completely fills the molding die cavity with the non-foamed molten thermoplastic material first and thereafter pushes out a molten core layer constituting 60 to 70% of the total filling amount to form the hollow part. This generates a large amount of excess thermoplastic material to be pushed out, resulting in an increase in the cost of recycling the thermoplastic material. Another problem is that this method requires a large injection molding machine that has an injection unit with an injection volume larger than the volume of a hollow molded article. This method, therefore, is considered uneconomical.

Japanese Patent Application Publication No. 2002-18911 discloses a method for molding a resin pipe having a bent pipe part, the method using the same principle as the above-described method for producing a pipe member. The method disclosed in this patent publication is a method for molding a resin pipe, which uses an injection step of injecting a molten resin into a main die cavity for forming an exterior surface of a resin pipe and a sliding mold insertion step of slide-inserting a plurality of sliding molds up to certain positions in the cavity, to mold an end part inner circumferential surface of all pipe parts, introduces pressurized fluid to the molten resin in a region including a part of the bent pipe part without the sliding molds through at least one of the plurality of sliding molds having the region there between, and removes excess molten resin from the region, the excess molten resin being pushed out by the introduction of the pressurized fluid through the other sliding molds.

This method is capable of molding, with high accuracy, an end part of each pipe part and molding the resin pipe having the bent pipe part as a component. However, this method, too, is not a technology for making the pipe part as thin as possible, the pipe part being formed at least by the pressurized fluid.

Japanese Patent Application Publication No. 2002-141405 discloses a method for molding a hollow molded article, which has the steps of introducing a first molding material into a molding die, introducing a second molding material having a viscosity different from that of the first molding material into the first molding material, and thereafter introducing gas for forming a hollow part into the second molding material.

According to this method, for example, setting the viscosity of the first molding material to be higher than that of the second molding material and introducing the first and second molding materials in small amounts can increase the width of a gas passage and the diameter in the width direction of the hollow part. In other words, this method can realize the effect of molding a thin hollow mold. However, such configuration in which the different types of molding materials are introduced into the molding die complicates at least an device for forming the hollow part, thus creating a new problem of an equipment cost increase.

In addition, although different in terms of technical field, there exists a technology for producing a lightweight foam sheet or foam member using a chemical or physical foaming agent. The chemical foaming agent decomposes at a predetermined temperature to generate gas. Mixing such chemical foaming agent with a raw resin and heating the mixture at an over the decomposition temperature of the chemical foaming agent can generate gas in the raw resin. Advantages of using this chemical foaming agent are that the gas is generated accurately depending on the decomposition temperature, that the decomposition temperature can be adjusted easily by adding a foaming assistant agent, and that foam with closed cells can be obtained easily. The physical foaming agent, on the other hand, is a low boiling point organic compound such as butane, pentane, or dichlorodifluoromethane and gasifies a synthetic resin, mixed with the low boiling point organic compound, by releasing the synthetic resin to a low pressure area, to create gas bubbles. The use of this physical foaming agent is characterized in having excellent solubility due to the affinity between the low boiling point organic compound and the resin and that a high expansion ratio foam can be obtained easily due to its excellent retention performance.

Moreover, in recent years the technical field for producing a foam member has a technology that uses supercritical fluid as a foaming agent. Japanese Patent Publication No. 4339296, for example, discloses a method for producing a thermoplastic resin foam injection mold that uses supercritical fluid. This method adds carbon dioxide or nitrogen supercritical fluid to a molten thermoplastic resin to obtain a miscible state thereof, reduces the temperature of the molten thermoplastic resin to a predetermined temperature while keeping a critical pressure, injects the molten thermoplastic resin into a molding die by means of an injection device while keeping the pressure, and reduces the pressure inside the molding die to generate foam. This can produce foam that has an excellent surface exterior, integrated non-foamed part on its outer layer, and cells with a fine average cell diameter and uniform average cell density.

On the other hand, "Study on Microcellular Foaming Using Supercritical Fluid in Injection Molding (2)" by Mr. Takehiro Yamada (or T. Yamada), Prof. Yasuhiko Murata (or Y. Murata), and Prof. Hidetoshi Yokoi (or H. Yokoi), the 6th issue (2008) of Reports of Saitama Industrial Technology Center, describes the study on visualization of the inside of a molding die by using a glass insert mold and a super microcellular foaming mechanism using supercritical fluid. According to this report, an outer layer has a skin layer with no cells as viewed in a thickness direction, and a central part of the material has a core layer having a large number of cells.

An experiment similar to the one described above is reported in "Visualization of MuCell (microcellular foam injection molding)" by Mr. Michio Komatus (M. Komatus) and Prof. Masahiro Ohshima (M. Ohshima), Seikei-Kakou Vol. 22 No. 2 (2010). This report describes that "the viscosity of a resin outermost surface part (skin) increases drastically because the heat of the resin is drawn to the surface of the molding die during the process of filling the die with the resin."

DISCLOSURE OF THE INVENTION

The present invention was contrived in view of the background art described above, and an object thereof is to provide a method and device for producing a pipe member, which is capable of making the thickness of a resultant product as thin as possible and reducing the required amount of thermoplastic material, without complicating the device.

In order to achieve the object described above, the present invention provides a method and device for producing a pipe member according to (1) to (12) described hereinafter.

(1) A method for producing a pipe member, having a thermoplastic material filling process for filling a die with a thermoplastic material, and a thermoplastic material discharging process for pushing out an unsolidified part of the thermoplastic material in the molding die by using pressurized fluid, wherein the thermoplastic material is mixed with a foaming agent, the method further has a process for foaming the thermoplastic material filling the molding die, and the thermoplastic material discharging process is a process for pushing out a inner part of the thermoplastic material, foamed in the molding die, by using the pressurized fluid prior to solidification of the inner part.

(2) The method for producing a pipe member according to (1) described above, wherein the thermoplastic material is thermoplastic or thermoplastic elastomer, and the foaming agent is carbon dioxide and/or nitrogen and is mixed with the thermoplastic material at a temperature and a pressure at which the carbon dioxide and/or the nitrogen can be kept in a supercritical fluid state.

(3) The method for producing a pipe member according to (1) described above, wherein the pressurized fluid is made of nitrogen gas and/or water.

(4) The method for producing a pipe member according to (1) described above, wherein the pressurized fluid is made of air and/or water.

(5) The method for producing a pipe member according to (1) described above, wherein the thermoplastic material is further mixed with a melt tension modifier.

(6) The method for producing a pipe member according to (1) described above, wherein the thermoplastic material is further mixed with reinforced fibers.

(7) An device for producing a pipe member, having a molding die for molding a pipe member, thermoplastic material filling means for filling the molding die with a thermoplastic material, and thermoplastic material discharging means for pushing out an unsolidified part of the thermoplastic material in the molding die by using pressurized fluid, wherein the thermoplastic material filling means has thermoplastic material supply means, foaming agent supply means, and a thermoplastic material injection machine that mixes the thermoplastic material supplied by the thermoplastic material supply means with a foaming agent supplied by the foaming agent supply means and injects the mixture, the thermoplastic material discharging means has a fluid tank, pressurizing means for pressurizing fluid stored in the fluid tank, and a pressurized fluid control valve for controlling the pressurized fluid, and after the molding die is filled with the thermoplastic material mixed with the foaming agent by using the thermoplastic material injection molding machine, the pressurized fluid control valve is opened to push out an unsolidified and foamed thermoplastic material in the molding die by using the fluid pressurized by the pressurizing means.

(8) The device for producing a pipe member according to (7) described above, wherein the foaming agent is carbon dioxide and/or nitrogen and is supplied by the foaming agent supply means into the thermoplastic material injection molding machine in which a temperature and a pressure are equal to or greater than those at which the carbon dioxide and/or the nitrogen become supercritical fluid.

(9) The device for producing a pipe member according to (7) described above, wherein the foaming agent is carbon dioxide and/or nitrogen, and the carbon dioxide and/or the nitrogen, which is in a supercritical fluid state beforehand, is supplied from the foaming agent supply means to the thermoplastic material injection molding machine.

(10) The device for producing a pipe member according to (7) described above, wherein the thermoplastic material is mixed with a melt tension modifier beforehand.

(11) The device for producing a pipe member according to (7) described above, wherein the thermoplastic material filling means further has melt tension modifier supply means, and the thermoplastic material injection machine mixes the thermoplastic material supplied by the thermoplastic material supply means with the foaming agent supplied by the foaming agent supply means and a melt tension modifier supplied by the melt tension modifier supply means, and injects the mixture.

(12) The device for producing a pipe member according to (7) described above, wherein the thermoplastic material is mixed with reinforced fibers beforehand.

The greatest characteristic of the method and device for producing a pipe member according to the present invention is to produce a pipe member by foaming the thermoplastic material, mixed with the foaming agent, in the die and pushing out the foamed thermoplastic material by using the pressurized fluid. As a result, the following effects can be obtained.

(a) Because the foamed part forms a cell structure filled with gas, the thermal conductivity of the foamed part is lower than a solid part. For this reason, the heat is hardly transmitted to the thermoplastic material that melts in the inner part of the molding die, thereby keeping the high temperature easily. On the other hand, the temperature drastically drops at a part of the thermoplastic material that comes into contact with an inner surface of the cavity formed by the molding die. Therefore, this part of the thermoplastic material is not foamed and forms a thin skin layer having less gas bubbles. However, the thermoplastic materials of the conventional technologies are solid with no gas bubbles and therefore have high thermal conductivities. Therefore, the temperature of the part that does not come into direct contact with a cavity inner surface decreases easily, inevitably making the skin layer (highly viscous part) thick. Specifically, the method and device for producing a pipe member according to the present invention in which the foaming agent is used, can create a pipe member that is thinner than those of the conventional technologies.

(b) Furthermore, adjusting the pressure and temperature inside the cavity can change the foaming conditions of the foaming agent and hence the time at which gas bubbles are generated, the size of the gas bubbles, and the density of the gas bubbles. In other words, changing the foaming conditions can change the thickness of the skin layer and the viscosity of the core layer (the foamed central part). As a result, a pipe member of a desired thickness can be created easily.

(c) Because the core layer contains the gas bubbles, a less amount of the thermoplastic material is necessary, compared to the solid parts obtained in the conventional technologies. This can reduce the capacity of a material tank of the injection molding machine for storing the thermoplastic material, and the capacity of an overflow cavity for recovering the material that is pushed out by the pressurized fluid in order to form the hollow part. In addition, the amount of the material used can be reduced by approximately 10 to 50%, reducing the material cost and the recycling cost.

(d) The thermoplastic material in the inner part of the cavity is low in viscosity at a high temperature in the conventional technologies as well. On the contrary, when the central part is foamed and unsolidified as in the present invention, the viscosity of the thermoplastic material in this part is extremely low. In other words, the fluidity thereof is extremely high. Thus, the thermoplastic material can be pushed out easily by the pressurized fluid, and a device for using the pressurized fluid can be made smaller than those of the conventional technologies.

(e) When using carbon dioxide and/or nitrogen supercritical fluid as the foaming agent, fine bubbles are formed. As a result, a pipe member has a thin and smooth inner circumferential surface with less asperity. When, on the other hand, nitrogen gas, air, water, a combination of nitrogen gas and water or a combination of air and water is used as the pressurized fluid, the core part can be pushed out without causing the pressurized fluid to have a chemical reaction with the thermoplastic material. Therefore, a safe and inexpensive pipe member can be produced.

(f) When mixing the thermoplastic material with the melt tension modifier in addition to the foaming agent, the melt tension modifier improves strain hardening behavior under uni-axial elongational viscosity of thermoplastic material, and, consequently, fine and homogenous foam is formed by the foaming agent. In addition, push out of the material by the pressurized fluid can be performed homogenously, and a thin pipe member with less thickness deviation can be produced. Moreover, adjusting the press and temperature inside the cavity can change the foaming conditions of the foaming agent and hence the thickness of the skin layer and the viscosity of the core layer (the foamed inner part). As a result, a pipe member of a desired thickness can be created easily.

(g) When using the thermoplastic material further mixed with the reinforced fibers, the reinforced fibers concentrate on the skin layer and are oriented in the same direction as the direction in which the thermoplastic material flows, due to the foaming effects of the foaming agent of the thermoplastic material in the molding die. Accordingly, the pipe member can be provided with a pipe wall reinforced effectively by the reinforced fibers, and the pipe member in which the reinforced fibers are not exposed on an inner wall surface thereof can be molded.

BRIEF DESCRIPTION OF THE DRAWINGS

FIG. 4 is a diagram showing a state of a thermoplastic material inside a molding die cavity, which is obtained in a thermoplastic material filling process according to a conventional technology, wherein FIG. 4(a) is a longitudinal cross-sectional diagram taken along an axial direction of the thermoplastic material of the molding die cavity, FIG. 4(b) a traverse cross-sectional diagram taken along a direction perpendicular to an axis of the thermoplastic material of the molding die cavity, and FIG. 4(c) a graph that schematically shows a viscosity distribution η(r) of the thermoplastic material in the molding die cavity as a function of a radial position r of the molding die cavity; and FIG. 5 is a diagram showing a state of the thermoplastic material inside the molding die cavity, which is obtained in a thermoplastic material discharging process according to the conventional technology, wherein FIG. 5(a) is a longitudinal cross-sectional diagram taken along an axial direction of the thermoplastic material of the molding die cavity, and FIG. 5(b) a traverse cross-sectional diagram taken along line p-p of FIG. 5(a).

BEST MODE FOR CARRYING OUT THE INVENTION

Embodiments of the method and device for producing a pipe member according to the present invention are described hereinafter in detail with reference to the drawings.

Figure 1:
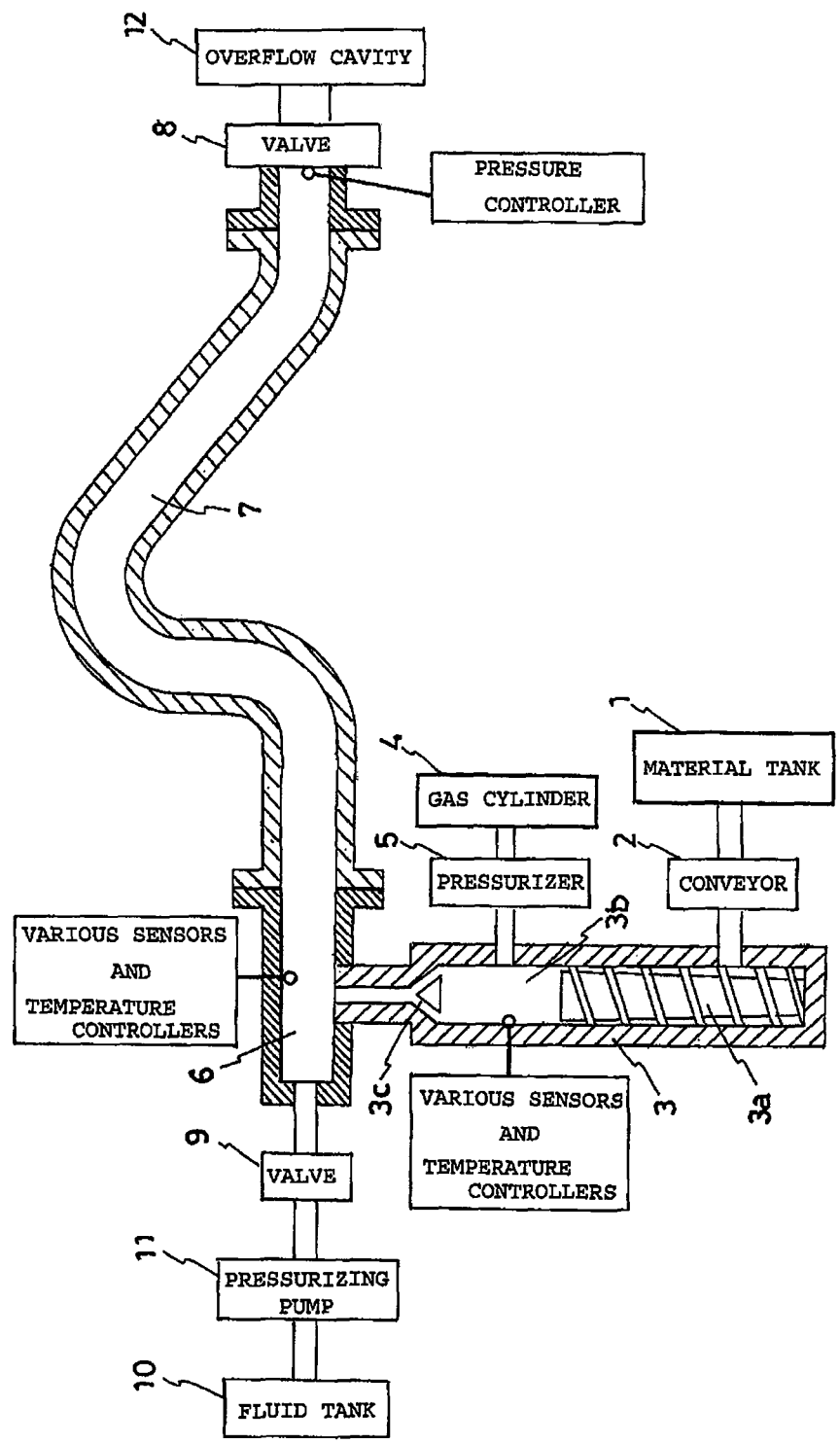
FIG. 1 is a schematic diagram showing an example of an embodiment of a method and device for producing a pipe member according to the present invention.

FIG. 1 is a schematic diagram showing an example of an embodiment of the method and the device according to the present invention.

In the embodiment shown in the diagram, a thermoplastic material is stored in a material tank 1.

Various materials such as thermoplastic and thermoplastic elastomer, for example, can be used as the thermoplastic material. Examples of the thermoplastic include polyolefin resins such as polyethylene and polypropylene resin, polyester resin, polyamide resin, polyphthal-amide resin, polyphenylene sulphide resin, and polycarbonate resin. Examples of the thermoplastic elastomer include polyolefin thermoplastic elastomer, chlorinated polyethylene thermoplastic elastomer, polystyrene thermoplastic elastomer, polyurethane thermoplastic elastomer, polyester thermoplastic elastomer, and polyamide thermoplastic elastomer.

These thermoplastic materials can be mixed with various additives. Examples of the additives include carbon particles, metal particles, pigments, calcium carbonate, glass fibers, glass beads, nanofibers, carbon nanotubes, and whiskers.

It is preferred that the thermoplastic material be mixed with a melt tension modifier. The melt tension modifier may be mixed in the thermoplastic material beforehand or may be mixed simultaneously with or in tandem with mixing of an after-mentioned foaming agent into the thermoplastic material. Mixing the melt tension modifier can improve strain hardening behavior under uni-axial elongational viscosity of the thermoplastic material, resulting in inhibiting heterogeneous growth of gas bubbles caused by the foaming agent, realizing fine and even foaming, realizing push out using after-mentioned pressurized fluid without generating uneven thickness, and easy production of a thin and homogenous pipe member. Examples of the melt tension modifier include acrylic-modified polytetrafluoroethylene and styrene elastomer modifier. Commercial products such as METABLEN A-3000 (Mitsubishi Rayon Co., Ltd.) and Fluon PTFE (Asahi Glass Co., Ltd.) can be used as the acrylic-modified polytetrafluoroethylene. Commercial products such as Nofalloy TZ series (NOF Corporation) and Actymer series (Riken Technos Corporation) can be used as the styrene elastomer modifier. It is preferred that the melt tension modifier is mixed into the thermoplastic material at a ratio of 0.05 to 10 parts by weight or more preferably 1 to 5 parts by weight to 100 parts by weight of the thermoplastic material. Mixing the melt tension modifier at a ratio of less than 0.05 parts by weight cannot contribute to an increase in melt tension and cannot obtain the effects of the modifier. However, when the melt tension modifier is mixed at a ratio of over 10 parts by weight, the melt tension modifier remains in a resultant product as impurities, deteriorating the product performance such as the strength of the product.

Note that the embodiment shown in the diagram uses a product in which 3 parts by weight of METABLEN A-3000 is added and mixed with 100 parts by weight of glass fiber-reinforced polyamide resin (PA66 GF 30%).

The thermoplastic material that is supplied from the material tank 1 is sent to a thermoplastic material injection machine 3 via a conveyor 2 or simply via a hopper (not shown). The material tank 1 and the conveyor 2 configure the thermoplastic material supply means.

In the thermoplastic material injection machine 3 the thermoplastic material is conveyed by a plunger type or screw type carrier unit 3a or conveyed while being mixed by the same, and is then sent to a pre-injection chamber 3b. The thermoplastic material injection molding machine 3 further has internal temperature measuring means, internal pressure measuring means, temperature adjusting means, pressure adjusting means and the like, which are not shown, to adjust the temperature and the pressure of the thermoplastic material to be mixed.

The foaming agent is added to thermoplastic material that is melted in the thermoplastic material injection machine 3.

A chemical foaming agent, such as azodicarbonamide or sodium bicarbonate, which decomposes at a predetermined temperature/pressure to generate gas, or a physical foaming agent that is made of a low boiling point organic compound such as butane, pentane, and dichlorodifluoromethane and turns into a gas by being released to a low pressure area, can be used as the foaming agent. Such technology for adding and mixing the foaming agent into the molten thermoplastic material belongs to the conventionally known technologies and can be used in the present invention as well.

Carbon dioxide or nitrogen can be used as the physical foaming agent. It is understood that, in an ordinary method carbon dioxide or nitrogen does not much diffuse in the thermoplastic material but diffuses well in the thermoplastic material when formed into supercritical fluid and creates fine gas bubbles when released to a low pressure area. In this embodiment, carbon dioxide or nitrogen supercritical fluid is used as the foaming agent. The carbon dioxide supercritical fluid is obtained at a temperature of equal to or greater than 31.1° C. and a pressure of equal to or greater than 7.38 MPa, whereas the nitrogen supercritical fluid is obtained at a temperature of equal to or greater than −147° C. and a pressure of equal to or greater than 3.40 MPa. Supercritical carbon dioxide or nitrogen can be used alone as the foaming agent, but a combination of carbon dioxide and nitrogen may be used as well.

A gas cylinder 4 is filled with carbon dioxide or nitrogen and has the pressure thereof increased by a pressurizer 5 to 7.38 MPa or greater for carbon dioxide and 3.40 MPa for nitrogen. The carbon dioxide or nitrogen is formed into supercritical fluid by being heated according to need. The gas cylinder 4 and the pressurizer 5 configure the foaming agent supply means.

As described above, the thermoplastic material injection machine 3 has the internal temperature measuring means, the internal pressure measuring means, the temperature adjusting means, the pressure adjusting means and the like. The temperature and the pressure inside the pre-injection chamber 3b of the thermoplastic material injection machine 3 are at levels that can keep the carbon dioxide or the nitrogen in a super-critical fluid state. In this state, the carbon dioxide or nitrogen supercritical fluid is introduced into the pre-injection chamber 3b. While keeping the supercritical fluid state, the carbon dioxide or the nitrogen diffuses well in the thermoplastic material.

Note in this embodiment that although the carbon dioxide or nitrogen supercritical fluid is introduced, the same effects can be accomplished even when carbon dioxide or nitrogen, which is not supercritical fluid, is introduced to have the abovementioned levels of temperature and pressure to keep the gas in the supercritical fluid state in the thermoplastic material injection machine 3. A combination of carbon dioxide and nitrogen is technically not supercritical fluid but is referred to as supercritical fluid in the present specification.

In addition, the embodiment described above uses the thermoplastic material that has a predetermined amount of melt tension modifier mixed in beforehand. However, although not shown, a tank containing the melt tension modifier and a feeder for feeding the melt tension modifier of the tank may be connected to the thermoplastic material injection molding machine 3, to add and mix the melt tension modifier into the thermoplastic material simultaneously with or in tandem with the mixing of the foaming agent into the thermoplastic material that is performed by the foaming agent supply means. In this case, the tank containing the melt tension modifier and the feeder for feeding the melt tension modifier of the tank configure the melt tension modifier supply means.

In the thermoplastic material injection molding machine 3, a foaming nucleating agent for generating nuclei of bubbles and/or a foaming regulator can further be introduced. Introducing such agents belongs to the conventional technologies in the field of foaming technology. Therefore, descriptions of the details about the substance names, operations/effects and the like of the foaming nucleating agent and the foaming regulator are omitted in the present specification.

The thermoplastic material injection machine 3 described above is connected to a molding die 7 by an intermediate member 6, the molding die 7 being used for creating a pipe member. Depending on how complicated the structure of the die 7 is, the molding die 7 can be divided into two, three or more sections but needs to be assembled airtightly or fluid-tightly. When a nozzle 3c located at a tip of the thermoplastic material injection machine 3 is opened, the thermoplastic material of the present embodiment in which the carbon dioxide or nitrogen supercritical fluid diffuses is ejected from the high-pressure thermoplastic material injection machine 3 to the die 7 through the intermediate member 6. Due to drastic volume expansion, the carbon dioxide or nitrogen gasifies as the pressure decreases, thereby creating foam in cooperation with the viscosity of the thermoplastic material.

A part of the thermoplastic material in the molding die 7 that comes into contact with an inner surface of the molding die 7 has drastic increased temperature and reduced viscosity and solidifies without forming gas bubbles. On the other hand, an inner part of the thermoplastic material that does not come into contact with the molding die 7 generates gas bubbles due to the action of the foaming agent. The part in which gas bubbles are generated has a low thermal conductivity, rarely causes a temperature decrease, and therefore keeps its molten state. As a result, a thin skin layer with no gas bubbles, which comes into contact with the surface of the molding die 7, and a molten core layer, which does not come into contact with the molding die 7 but creates gas bubbles, are formed in the inner part.

Figure 2:
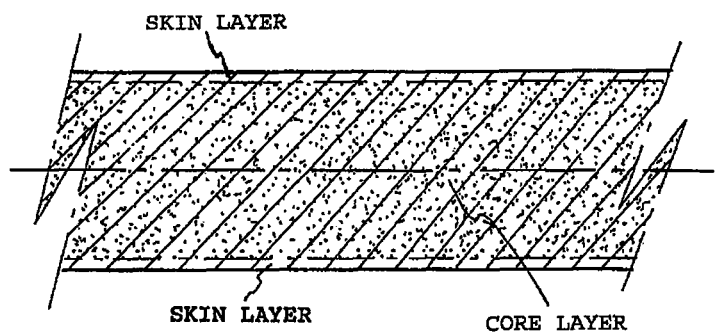
FIG. 2 is a diagram showing a state of a thermoplastic material inside a molding die cavity, which is obtained in a thermoplastic material filling process according to the present invention, wherein FIG. 2($a$) is a longitudinal cross-sectional diagram taken along an axial direction of the thermoplastic material of the molding die cavity, FIG. 2($b$) a traverse cross-sectional diagram taken along a direction perpendicular to an axis of the thermoplastic material of the molding die cavity, and FIG. 2($c$) a graph that schematically shows a viscosity distribution $\eta(r)$ of the thermoplastic material in the molding die cavity as a function of a radial position r of the molding die cavity.
Figure 2:
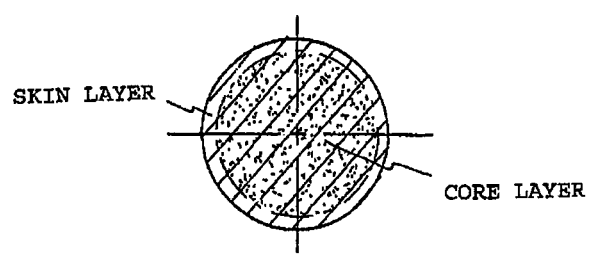
Figure 2:
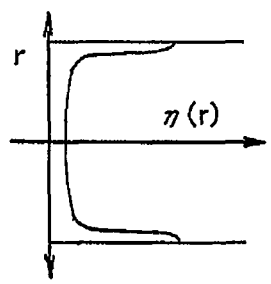

FIG. 2 is a diagram schematically showing distributions of the skin layer and the core layer in the molding die 7, the distributions being obtained after injecting the thermoplastic material into a cavity of the molding die 7, wherein FIG. 2(a) is a longitudinal cross-sectional diagram taken along an axial direction of the molding die cavity and FIG. 2(b) a traverse cross-sectional diagram taken along a direction perpendicular to the axis of the molding die cavity. These diagrams show a state in which the thin skin layer with no gas bubbles is formed in a part that is in contact with the molding die 7 and in which the core layer with gas bubbles is formed in the inner part. FIG. 2(c) is a graph schematically showing a viscosity distribution $\eta(r)$ of the thermoplastic material in the molding die cavity as a function of a radial position r of the molding die cavity. This diagram shows that the viscosity $\eta$ of the thin skin layer contacting with the inner surface of the molding die is high and that the viscosity $\eta$ of the core layer constituting a large portion of the thermoplastic material is extremely low due to the gas bubbles formed therein.

In the case where the thermoplastic material is mixed with the melt tension modifier, when gas bubbles are generated by the foaming agent, the action of the melt tension modifier can improve strain hardening behavior under uni-axial elongational viscosity of the thermoplastic material, resulting in inhibiting heterogeneous growth of the gas bubbles and realizing fine and even foaming. Therefore, the core layer with gas bubbles, which is located in the inner part as shown in FIG. 2, becomes a homogenous core layer that constitutes a large portion of the thermoplastic material, and the thin skin layer is formed. Furthermore, in the case where the thermoplastic material is mixed with the reinforced fibers, the reinforced fibers concentrate on the skin layer and are oriented in the same direction as the direction in which the thermoplastic material flows, due to the foaming effects of the foaming agent of the thermoplastic material in the molding die.

As shown in FIG. 1, in the present embodiment a downstream-side terminal of the molding die 7 is provided with a first valve 8 for closing the molding die 7. Moreover, a fluid tank 10 and a pressurizing pump 11 are connected to the intermediate member 6 on the upstream side by a second valve 9. Consequently, the molding die 7 forms a closed space. In a case where this sealability inhibits the introduction of the thermoplastic material or foaming of the foaming agent, a gas relief valve or a pressure controller of a negative pressure generating device or the like can be provided in the first valve 8 in order to prevent such inhibition. Further, various sensors and temperature controllers can be provided in order to control the temperature and pressure of the molding die 7. Providing these sensors and temperature controllers can control the temperature and the pressure inside the molding die 7 to desired values, control foaming of the foaming agent and the strain hardenability of the extensional viscosity obtained by the melt tension modifier, and change the formation of the skin layer to various desired states.

The fluid tank 10 is filled with nitrogen gas, air, water a combination of nitrogen gas and water, or a combination of air and water. The fluid therein is pressurized by the pressurizing pump 11. After the formation of the core layer and the skin layer in the molding die 7 as shown in FIG. 2, the first valve 8 on the downstream side and the second valve 9 on the upstream side functioning as the pressurized fluid control valve are opened at appropriate timing. As a result, the pressurized fluid vigorously flows into the molding die 7 via the intermediate member 6. Here, the appropriate timing means when the skin layer and the core layer are formed but at least the core layer is not yet solidified and the skin layer has a thickness that sets the thickness of the product at a desired value. The fluid tank 10, the pressurizing pump 11, and the second valve 9 configure the thermoplastic material discharging means.

Figure 3:
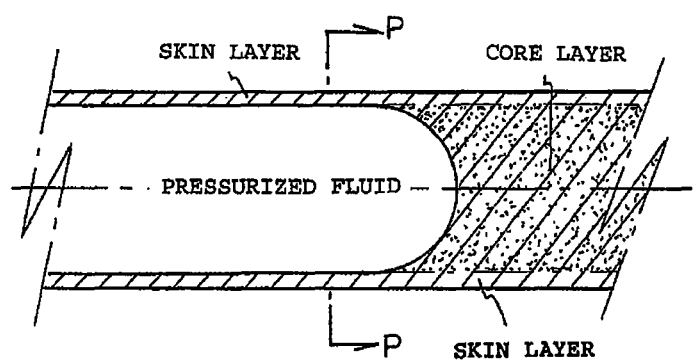
FIG. 3 is a diagram showing a state of the thermoplastic material inside the molding die cavity, which is obtained in a thermoplastic material discharging process according to the present invention, wherein FIG. 3($a$) is a longitudinal cross-sectional diagram taken along the axial direction of the thermoplastic material of the molding die cavity and FIG. 3($b$) a traverse cross-sectional diagram taken along line P-P of FIG. 3($a$)
Figure 3:
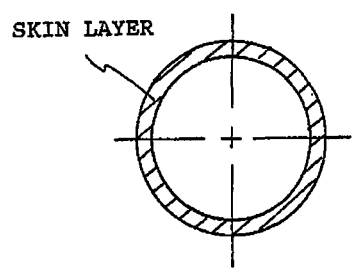
Figure 4:
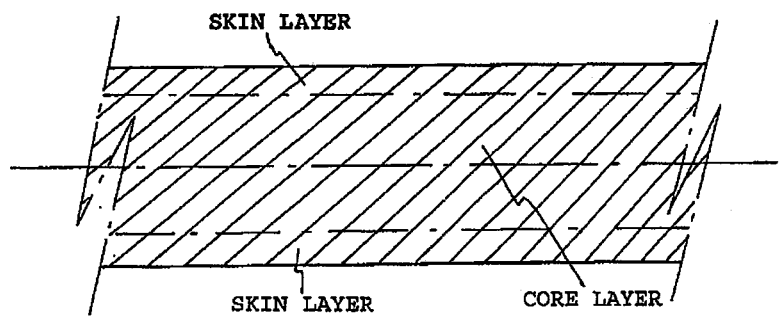
Figure 4:
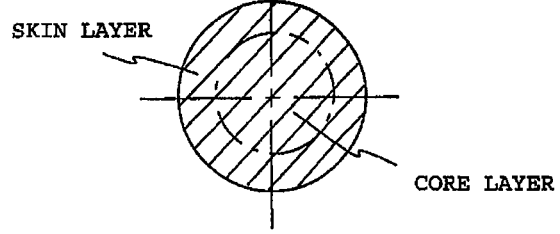
Figure 4:
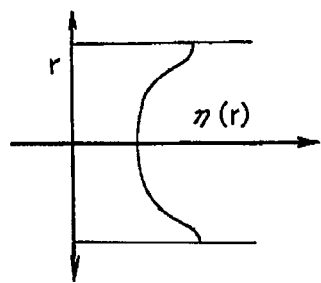
Figure 5:
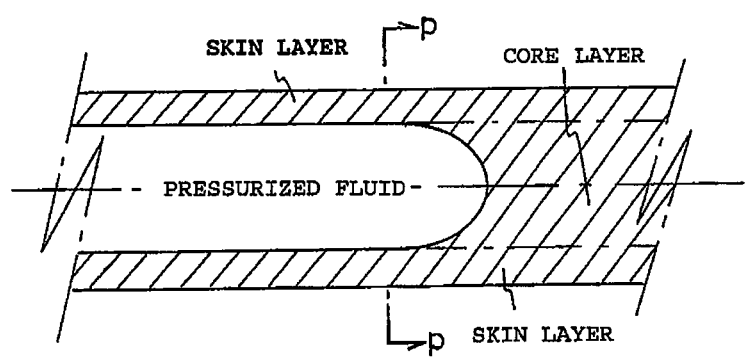
Figure 5:
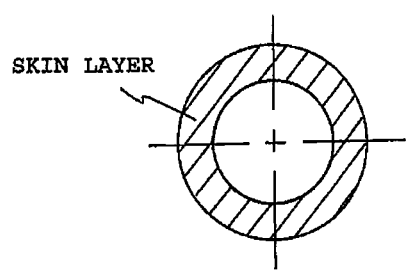

Due to the gas bubbles and low viscosity of the core layer, the core layer can easily be pushed out by the introduced pressurized fluid which is in direct contact with the core layer. FIG. 3 is a diagram showing a state of the molding die cavity obtained in this thermoplastic material discharging process, wherein FIG. 3(a) is a longitudinal cross-sectional diagram taken along the axial direction of the thermoplastic material in the molding die cavity, showing a state in which the pressurized fluid is introduced and consequently the low-viscous core layer in the central part is pushed out. FIG. 3(b) is a traverse cross-sectional diagram taken along line P-P of FIG. 3(a), showing a state in which a large hollow part is formed in the inner part.

The pushed out core layer passes through the first valve 8 and is recovered by an overflow cavity 12. Because the skin layer has no gas bubbles and is high in viscosity, the skin layer is not pushed out by the pressurized fluid and forms a wall surface of the pipe member. In so doing, since the skin layer is thin, the pipe member, the product, can be made thin.

In the case where the thermoplastic material is mixed with the melt tension modifier, the process of discharging the thermoplastic material by means of the pressurized fluid improves strain hardening behavior under uni-axial Elongational viscosity of the thermoplastic material due to the action of the melt tension modifier. For this reason, the push out by the pressurized fluid can be performed without generating uneven thickness in the pipe member, and the thin, homogeneous pipe member can be formed by means of fluid-assisted injection molding. When the thermoplastic material is mixed with the reinforced fibers, the reinforced fibers concentrate on the skin layer and are oriented in the same direction as the direction in which the thermoplastic material flows, due to the foaming effects of the foaming agent of the thermoplastic material in the molding die, as described above. As a result, the pipe member can be provided with a pipe wall reinforced effectively by the reinforced fibers, and the pipe member in which the reinforced fibers are not exposed on an inner wall surface thereof can be molded.

Then, when the hollow mold is cooled to approximately a transition temperature and solidified, the thermoplastic material is removed from the die 7 to obtain the pipe member. In the present invention, changing the temperature, pressure or a combination thereof inside the cavity of the molding die 7 can easily change the volume ratio between the skin layer with no gas bubbles and the core layer with gas bubbles. Using the difference in viscosity between the skin layer with no gas bubbles and the core layer with gas bubbles, the pipe member with a desired thickness can be obtained by pushing out the low-viscous core layer using the pressurized fluid.

The above has described the embodiments of the method and device for producing a pipe member according to the present invention. However, the present invention is not limited thereto, and various modifications and changes can be made within the technical idea of the present inventions described in the patent claims.

INDUSTRIAL APPLICABILITY

The method and device for producing a pipe member according to the present invention described above is capable of making the thickness of a resultant product as thin as possible and reducing the required amount of thermoplastic material, without complicating the device. Therefore, the method and device for producing a pipe member according to the present invention can be used widely in the production of pipes used in automobiles and household electric appliances.

The invention claimed is:

1. A method for producing a pipe member, comprising:
   filling a molding die with a thermoplastic material containing a foaming agent;
   foaming the thermoplastic material in the molding die while controlling pressure and temperature conditions inside the molding die to provide a foamed core layer and a non-foamed skin layer; and
   discharging an unsolidified part of the thermoplastic material from the molding die by introducing or flowing pressurized fluid into the thermoplastic material in the molding die prior to a solidification of the core layer and using the pressurized fluid directly contacting the unsolidified thermoplastic material to push the unsolidified thermoplastic material out of the molding die and out of the skin layer.

2. The method for producing a pipe member according to claim 1, wherein the thermoplastic material is thermoplastic or thermoplastic elastomer, and the foaming agent is carbon dioxide and/or nitrogen and is mixed with the thermoplastic material at a temperature and a pressure at which the carbon dioxide and/or the nitrogen can be kept in a supercritical fluid state.

3. The method for producing a pipe member according to claim 1, wherein the pressurized fluid is made of nitrogen gas and/or water.

4. The method for producing a pipe member according to claim 1, wherein the pressurized fluid is made of air and/or water.

5. The method for producing a pipe member according to claim 1, wherein the thermoplastic material is further mixed with a melt tension modifier.

6. The method for producing a pipe member according to claim 1, wherein the thermoplastic material is further mixed with reinforced fibers.

7. An device for producing a pipe member, comprising:
   a molding die for molding a pipe member;
   thermoplastic material filling means for filling the molding die with a thermoplastic material; and
   thermoplastic material discharging means for introducing or flowing pressurized fluid into direct contact with the thermoplastic material in said molding die to thereby push out an unsolidified part of the thermoplastic material in the molding die,
   wherein the molding die is provided with a controller which controls temperature and pressure conditions of thermoplastic material in said molding die,
   wherein the thermoplastic material filling means has thermoplastic material supply means, foaming agent supply means, and a thermoplastic material injection machine that mixes the thermoplastic material supplied by the thermoplastic material supply means with a foaming agent supplied by the foaming agent supply means and injects the mixture,
   the thermoplastic material discharging means has a fluid tank, pressurizing means for pressurizing fluid stored in the fluid tank, and a fluid control valve for controlling flow of the pressurized fluid from the fluid tank into thermoplastic material in said molding die, and
   after the molding die is filled with the thermoplastic material mixed with the foaming agent by using the thermoplastic material injection machine, and the thermoplastic material in said molding die is foamed under temperature and pressure control by said controller, the fluid control valve is opened to push out an unsolidified and foamed thermoplastic material in the molding die by using the fluid pressurized by the pressurizing means.

8. The device for producing a pipe member according to claim 7, wherein the foaming agent is carbon dioxide and/or nitrogen and is supplied by the foaming agent supply means into the thermoplastic material injection molding machine in which a temperature and a pressure are equal to or greater than those at which the carbon dioxide and/or the nitrogen become supercritical fluid.

9. The device for producing a pipe member according to claim 7, wherein the foaming agent is carbon dioxide and/or nitrogen, and the carbon dioxide and/or the nitrogen, which is in a supercritical fluid state beforehand, is supplied from the foaming agent supply means to the thermoplastic material injection molding machine.

10. The device for producing a pipe member according to claim 7, wherein the thermoplastic material filling means is configured to fill the molding die with the thermoplastic material mixed with a melt tension modifier.

11. The device for producing a pipe member according to claim 7, wherein the thermoplastic material filling means further has melt tension modifier supply means, and
the thermoplastic material injection machine mixes the thermoplastic material supplied by the thermoplastic material supply means with the foaming agent supplied by the foaming agent supply means and a melt tension modifier supplied by the melt tension modifier supply means, and injects the mixture.

12. The device for producing a pipe member according to claim 7, wherein the thermoplastic material filling means is configured to fill the molding die with the thermoplastic material mixed with reinforced fibers.

\* \* \* \* \*